UNITED STATES PATENT OFFICE.

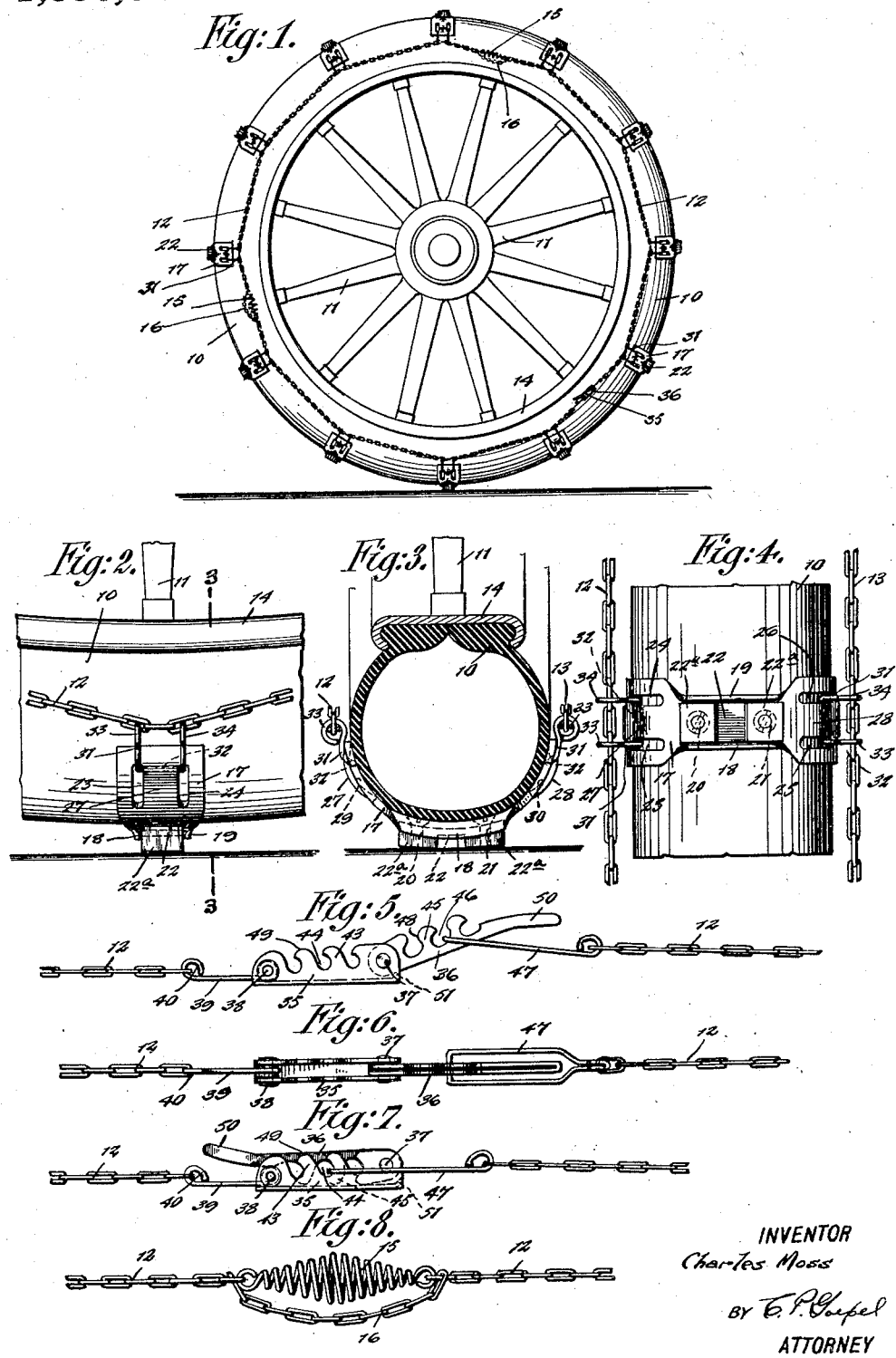
C. MOSS.
ANTISLIPPING ATTACHMENT FOR VEHICLE WHEELS.
APPLICATION FILED JUNE 30, 1919.
1,393,810. Patented Oct. 18, 1921.
INVENTOR
Charles Moss
BY E. P. Goepel
ATTORNEY

CHARLES MOSS, OF NEW YORK, N. Y., ASSIGNOR TO MOSSGRIP CO., INC., OF NEW YORK, N. Y.

ANTISLIPPING ATTACHMENT FOR VEHICLE-WHEELS.

1,393,810.  Specification of Letters Patent.  Patented Oct. 18, 1921.

Application filed June 30, 1919. Serial No. 307,673.

*To all whom it may concern:*

Be it known that I, CHARLES MOSS, a citizen of the United States, residing in the borough of Manhattan, city, county, and State of New York, have invented certain new and useful Improvements in Antislipping Attachments for Vehicle-Wheels, of which the following is a specification.

The present invention relates to improvements in anti-slipping attachments for vehicle wheels, and particularly such attachments adapted to be engaged with the tread of solid or pneumatic tires of automobile wheels. An object of the invention is to provide such means which will be of simple and inexpensive construction, will be durable and will effectually prevent skidding without wear or other injurious effects upon the tire structure, and without injury to the street. More particularly I propose to provide such a device which will have a renewable ground engaging portion, so formed as to provide an efficient resistant surface to skidding, slippage, etc., and also I propose to provide means for snugly holding the anti-slipping members in contact with the tire to the end that there will be no looseness and rattling, and frictional contact upon the tire which would tend to wear or scuff the same, will be reduced to a minimum. The invention also contemplates a device of this character which will not engage, and will therefore not scratch or otherwise mar the felly of the wheel, the same being entirely confined to contact with the resilient surface of the tire.

A further object is to provide improved means for tightening the connections extending between the several ground engaging anti-slipping members and particularly to provide such means which will be automatically held in its closed position, will not become accidentally disengaged and will permit of adjustable engagement of the ends of the connection means therewith.

With these and other objects in view, an embodiment of my invention is shown in the accompanying drawings and this embodiment will be hereinafter more fully described with reference thereto and the invention will be finally pointed out in the claims.

In the accompanying drawings:

Figure 1 is a side elevation of an automobile wheel provided with an anti-slipping attachment according to one embodiment of my invention;

Fig. 2 is an enlarged side elevation of a portion of the wheel and one of the anti-slipping members in engagement therewith;

Fig. 3 is a vertical sectional view taken along the line 3—3 of Fig. 2;

Fig. 4 is a view showing the tread surface of a portion of the tire and the anti-slipping attachment;

Fig. 5 is a side elevation in open position, of the tightening means and the adjacent portions of the chain connection;

Fig. 6 is a plan view thereof with the parts in the same position disclosed in Fig. 5;

Fig. 7 is a side elevation showing the tightening means closed; and

Fig. 8 is a view of a portion of the connection chain showing one of the tension springs inserted therein.

Similar reference characters indicate corresponding parts throughout the several figures of the drawings.

Referring to the drawings and more particularly to Figs. 1 to 4 thereof, the tire 10 of the wheel 11 is provided in circumferentially spaced relation with a plurality of anti-slipping devices according to my invention, these being connected by chains 12 and 13 disposed at the sides of the tire, the extremities of the anti-slipping devices being disposed between the tread surface of the tire and the felly 14 of the wheel, and secured to links of the chain as will more fully hereinafter appear.

Tension spiral springs 15 are interposed in the chain at suitable intervals, the portions 16 of the chain between the ends of the spring being normally slack. The springs are preferably of the type shown in the drawings, tapering toward their ends so that the pull will come centrally on the springs, this giving an even tension and avoiding side strains. The portion of the chain between the ends of the spring may be omitted if desired.

The anti-slipping devices each comprise an arcuate tread engaging member 17 formed of metal, fiber or other suitable material, relatively wide at its non-ground engaging end portions, and provided at its ground engaging intermediate portion with outwardly bent side flanges 18 and 19 forming a channeled tread portion. Within this channeled tread portion there is removably secured by means of screws 20 and 21, a tread block 22 having ground engaging spaced projecting portions 22ª extending beyond the edges of the flanges 18 and 19 and constituting a resistant surface to slipping and skidding strains in all directions of movement of the wheel.

While the blocks are shown as having their portions 22ª formed in one piece with an intermediate connecting portion, it is of course understood that other constructions may be resorted to providing these portions 22ª, and these portions may have tread surfaces other than as specifically disclosed in the drawing. The sharp edges and corners of the said blocks engage the ground in such manner as to resist slippage or skidding in all directions, and especially side-skidding while their removability and replacement by new blocks enable the anti-slipping members to be always kept in efficient working order with facility and with very small expense. The tread is such that it will not injure the street. The tread block may be welded brazed or otherwise suitably secured to the member 17.

The end portions of the members 17 are provided with parallel spaced slots 23, 24 and 25, 26 respectively, the metal between the slots being bent outwardly as at 27 and 28 into curved relation with the surface of said members providing beneath the said portions 27 and 28 pockets or spaces 29 and 30.

U-shaped connection members 31 are provided at the ends of the members 17, the end portions being passed through the slots 23, 24 and 25, 26, the transverse intermediate portion being bent away from the said end portions as at 32 and disposed beneath the portions 27 and 28 in the pockets 29 and 30. Thus the end portions lie flat upon the surface of the members 17 and extend substantially in a line parallel to the curvature of the said member 17. The ends of the members 31 projecting beyond the ends of the members 17 are provided with eyelets 33 and 34 passing through the links of the chain 12 thereby connecting the anti-slipping devices to the chain.

The constant tension of the chain causes the anti-slipping devices to be held snugly in engagement with the tire. Any deflection of the tire which will cause a relative movement between the members 17 and the connection members 31 will permit such movement without any local depression or wear upon the tire by the portions 32 of the said members 31, the spaces 29 and 30 providing pockets within which said portions may freely slide.

The members 17 may be made of a single layer substance as shown or may be made in any other suitable manner to adapt the members 17 to the surfaces of the tire without injury thereto, in all constructions the slots 23, 24 and 25, 26 being preserved for receiving the members 31 therein.

The tightening and fastening means for the chain 12 comprises a channeled member 35 at one end of which there is provided a lever 36, pivoted at 37. At the other end of the said member 35 there is provided a transverse pin 38 about which one end of a connection member 39 is bent, the other end 40 passing through and bent about the link at one end of the chain.

The sides of the channel members 35 are provided with a series of hooks 43 and pockets 44 and similarly the lever 36 is provided with a series of hooks 45 and pockets 46 oppositely disposed to the said hooks 43 and pockets 44. At the end of the chain 12 there is provided a looped member 47 adapted to be engaged behind one of the hooks and in a pocket of the lever in the open position thereof (Fig. 5), the hooks being slightly bulged at their rear sides as at 48 to prevent slippage during engagement of the looped member therewith. The lever is thereupon swung about its pivot into the channeled member as indicated in Fig. 7, at which time the springs 15 are stretched to make the chain substantially taut, the opposed hooks of the member 35 and the lever 36 holding the member 47 in place while the disposition of the pivot 37 in offset relation to the line of pull upon the member 47 causes the locked relation of the parts to be maintained until manually released.

During locking of the device, the rounded ends 49 of the hooks 43 of the channeled member 35 will cause the looped member 47 to be positively forced into the pockets. When disengaging the looped member from the pockets, the ends of the hooks 45 of the lever will without chance of slipping, positively lift the same from the pockets. The end 50 of the lever 36 is inclined to provide a finger engaging space beneath the same in the locked position, thereby facilitating the unlocking action. An abutment 51 at the end of the channeled member prevents the lever from being completely depressed, the same being held in angular relation to the channeled member as indicated in Fig. 5 to provide a space beneath the same to permit gripping with the fingers.

My improvements, it will be seen, are of very simple construction, may be easily attached to the tire, and will effectually prevent slippage and provide a gripping and resistant surface upon the tread. The engagement of the same with the tire is such that wear upon the same is prevented and the renewability of the tread surface enables the attachment to be always maintained in effective condition.

I have illustrated and described a preferred and satisfactory embodiment of my invention, but it is obvious that changes may be made therein within the spirit and scope thereof as defined in the appended claims.

I claim:

1. In an anti-slipping attachment for vehicle wheels, an arcuate tire engaging member provided intermediate its ends with spaced apart outstanding longitudinal flanges and having relatively flat opposite end portions with pairs of spaced slots therein, and the portion of the member between the slots being pressed outwardly to form a pocket therebeneath and between the slots, a tread member secured between said flanges at the outer side of said tire engaging member, and attaching links connected to opposite ends of the tire engaging member, each link having an intermediate portion adapted to lie in one of said pockets and having end portions projecting through said slots and curved to project outwardly from the slots, said links being adapted to freely slide in said pockets for permitting relative movement between the tire engaging member and the links, and the pockets protecting the intermediate portions of the links from contact with the roadway.

2. In an anti-slipping attachment for vehicle wheels, a tire engaging member having anti-skid means at its central outer portion and provided with side parts extending inwardly about the side portions of the tire, said side parts provided with spaced slots therein, and the portion of the member between the slots being pressed outwardly to form a pocket therebeneath and between the slots, and attaching links connected to the opposite ends of the tire engaging member, each link having an intermediate portion adapted to lie in one of said pockets and having end portions projecting through said slots and curved to project outwardly from the slots, said links being adapted to freely slide in said pockets for permitting relative movement between the tire engaging member and the links, and the pockets protecting the intermediate portions of the links from contact with the roadway.

In testimony that I claim the foregoing as my invention, I have signed my name hereunder.

CHARLES MOSS.